United States Patent [19]
Natoli et al.

[11] Patent Number: 5,310,810
[45] Date of Patent: * May 10, 1994

[54] SEGMENTED COPOLYMERS

[75] Inventors: John Natoli, Ambler, Pa.; Min-Yin Chang, Houston, Tex.

[73] Assignee: Rohm and Haas Company, Philadelphia, Pa.

[*] Notice: The portion of the term of this patent subsequent to Sep. 21, 2010 has been disclaimed.

[21] Appl. No.: 33,657

[22] Filed: Mar. 16, 1993

Related U.S. Application Data

[63] Continuation-in-part of Ser. No. 898,979, Jun. 15, 1992, Pat. No. 5,247,024.

[51] Int. Cl.$^5$ .................. C08L 23/04; C08L 23/10; C08L 23/16; C08L 33/10
[52] U.S. Cl. .................. 525/298; 525/243; 525/244; 525/246; 525/262; 525/301; 525/302; 525/308; 525/309; 525/310; 525/248; 525/250; 524/458
[58] Field of Search ............ 525/298, 243, 244, 246, 525/262, 301, 302, 308, 309, 310, 248, 250; 524/458

[56] References Cited

U.S. PATENT DOCUMENTS

| | | | |
|---|---|---|---|
| 3,652,730 | 3/1972 | Favie et al. | 260/878 |
| 4,080,405 | 3/1978 | Agouri et al. | 260/878 |
| 4,097,554 | 6/1978 | Yui et al. | 260/878 |
| 4,370,450 | 1/1983 | Grigo et al. | 525/262 |
| 4,757,111 | 7/1988 | Hirai et al. | 525/309 |
| 5,247,024 | 9/1993 | Natoli et al. | 525/298 |

FOREIGN PATENT DOCUMENTS

| | | |
|---|---|---|
| 437808A2 | 12/1990 | European Pat. Off. |
| 49-2346 | 1/1974 | Japan |
| 2-29086 | 6/1990 | Japan |
| 3273014 | 12/1991 | Japan |
| 1312325 | 10/1969 | United Kingdom |

Primary Examiner—James J. Seidleck
Assistant Examiner—W. Robinson H. Clark

[57] ABSTRACT

An improved process for the preparation of segmented copolymers of polyolefins and poly(methacrylates) is disclosed.

12 Claims, No Drawings

SEGMENTED COPOLYMERS

BACKGROUND OF THE INVENTION

This application is a continuation-in-part of patent application U.S. Ser. No. 07/898,979, filed Jun. 15, 1992, now U.S. Pat. No. 5,247,024.

1. Field of the Invention

It has recently been shown by Ilenda et al. in U.S. Pat. No. 4,957,974, incorporated herein by reference, that segmented copolymers, such as graft copolymers, of polyolefins, such as polypropylene, within a specific molecular weight range, and of polymethacrylates within a certain composition and molecular weight range, are useful additives for polyolefins for imparting melt strength. Such segmented copolymers are also useful for the compatibilization of polyolefins and polar polymers. An improved process for the manufacture of these segmented copolymers has been sought to lower cost of manufacture and to yield the product in a more suitable particulate form.

2. Description of the Prior Art

The term "segmented copolymer" refers to polymers wherein at least one segment of polymer A is chemically joined to at least one segment of different polymer B, and encompasses block copolymers, where the segments are joined at least one end of the segments, and also graft copolymers, where there may be a trunk of polymer A to which one least one segment of polymer B is attached at a site on the trunk which is not at the end. Because it is difficult cleanly to separate and analyze polymers where a vinyl monomer such as styrene or methyl methacrylate is polymerized in the presence of a crystalline polyolefin, such as polypropylene, and because the possibility exists for both block and graft copolymers to be formed, we have chosen to use the inclusive term "segmented copolymers."

The prior art discloses many grafted polymers from vinyl monomers onto pre-formed polyolefins. Japanese Unexamined Patent Application Kokai 03-139510 discloses block copolymers as other segmented polymers which are useful in the same manner as the grafted segmented polymers disclosed by Ilenda et al.

The prior art further discloses many technologies to prepare segmented copolymers, especially by the polymerization of vinyl monomers in the presence of pre-formed polyolefins, such as in solution, in emulsion, in a solvent-swollen aqueous dispersion, and in an aqueous dispersion without a solvent. Again, relatively few of these references relate to aqueous-related processes wherein the vinyl monomer is an ester of a lower alkyl methacrylate, and none disclose the specific polymers with high molecular weight grafted chains as taught by Ilenda et al.

The methods disclosed for the polymerization of methacrylate ester monomers, such as methyl methacrylate, in the presence of a crystalline polymer, such as polypropylene, utilize methods which require a period of contact between the polymer and the monomer to be polymerized, which may further require the use of a solvent. The art, as exemplified by Grigo et al., U.S. Pat. No. 4,370,450 and Yui et al., U.S. Pat. No. 4,097,554, does not teach a rapid method for conducting the polymerization, and such a rapid method is desirable for commercial production.

A major difficulty with such rapid methods is achieving penetration of the crystalline polymer particle by the monomer, which is best effected by a co-solvent which is essentially inert to the free-radical polymerization process, and further by the use of the polyolefin in the form of flakes, pellets, and preferably porous spherical particles. A second major difficulty is the tendency of the polyolefin to clump upon contact with the monomer/solvent mixture during the initial stages of polymerization. Dispersing agents have been taught for the older process known to the art, but these are ineffective in the present process.

Thus, the art does not teach how to accomplish the desirable goal of a rapid process for forming in an aqueous medium the graft copolymer of the composition discovered by Ilenda et al., and to maintain that graft polymer in particulate form during polymerization, solvent removal, and final isolation.

SUMMARY OF THE INVENTION

We have discovered a process for preparation of a segmented copolymer of a polyolefin and of a polymer comprised of greater than about 50 weight percent of units derived from at least one alkyl methacrylate, comprising:

a. preparing a reaction mixture of about 100 parts of particles of polyolefin of average particle size below about 6 mm. with
  1. from about 150 to about 2000 parts of water;
  2. from about 10 to about 100 parts of a monomer mixture which is greater than 50% by weight of at least one alkyl methacrylate;
  3. from about 40 to about 200 parts of one or more organic solvents, miscible with the monomer mixture;
  4. from about 0.2 to about 5 parts of at least one dispersant, the at least one dispersant maintaining the polyolefin particles in particulate form, at least one dispersant being chosen from polymers which are copolymers of units derived from (meth)acrylic esters and at least one of units derived from a partially or totally neutralized copolymerizable unsaturated acid, the dispersant polymer preferably being of high molecular weight, such as above 100,000 and more preferably above about 3,000,000, and preferably being buffered to a pH between about 4.5 to about 5.5, such as with sodium dihydrogen phosphate;
  5. from about 0.1 to about 2 parts of at least one polymerization initiator;

b) polymerizing the monomer-solvent mixture in a pressure vessel with agitation at a heating rate of at least about 0.5° C./minute, preferably of at least 1° C./minute, until a temperature of at least about 75° C. is obtained;

c) holding the reaction mixture at the temperature of at least about 75° C. until the monomer is polymerized, the polymer being formed being at least partially grafted to the polyolefin to form the segmented copolymer, the segmented copolymer remaining in particulate form;

d) optionally further adding to the reaction vessel
  1. from about 10 to about 70 parts of a second monomer mixture which is greater than 50% by weight of at least one alkyl methacrylate;
  2. from about 5 to about 150 parts of organic solvent, miscible with the second monomer mixture;
  3. up to about 1 part of at least one dispersant, the at least one dispersant maintaining the polyolefin particles in particulate form, at least one dispersant being chosen from polymers which are copolymers of units derived from (meth)acrylic esters and at least one of units derived from a partially or totally neutralized copolymerizable unsaturated acid;
4. from about 0.01 to about 2 parts of at least one polymerization initiator;

e) optionally continuing heating at the rate of at least about 0.5° C./minute, preferably of at least about 1° C./minute, until essentially complete conversion of the monomers to polymer occurs, the polymer being formed being at least partially grafted to the polyolefin to form the segmented copolymer, the segmented copolymer remaining in particulate form;

f) separating the solvent from the segmented copolymer particles; and g) separating any remaining water from the particulate segmented copolymer particles.

The process is further useful for the preparation of segmented copolymers which segments of high molecular weight, such as wherein the polyolefin is a non-polar polyolefin selected from the group consisting of polyethylene, polypropylene, polybutylene, poly(4-methylpentene), copolymers of olefins with each other and copolymers of olefins with minor amounts of vinyl esters, vinyl chloride, (meth)acrylic ester and (meth)acrylic acid having a molecular-weight of from about 50,000 to about 1,000,000, and wherein the alkyl methacrylate polymer formed has a molecular weight of from about 20,000 to about 200,000.

The methacrylate polymer formed may contain up to about 50%, preferably up to about 20%, of units derived from at least one other methacrylate ester, an acrylate ester, an unsaturated copolymerizable acid, glycidyl methacrylate, or a vinyl aromatic monomer. Preferred co-monomers at about the 5% level are ethyl acrylate, butyl acrylate, glycidyl methacrylate, and (meth)acrylic acid. The units derived from the unsaturated copolymerizable acid may be at least partially converted to an ammonium, alkaline earth, alkali metal, or zinc salt prior to or during isolation.

The process is especially useful when the polyolefin is polypropylene, by which is meant polypropylene homopolymers, including both isotactic and syndiotactic polypropylene, and copolymers of polypropylene with other olefins, such as ethylene, which copolymers are non-rubbery, and especially when they are crystalline.

A preferred process, because of its ready adaptation to a variety of equipment and its ability reproducibily to produce segmented copolymers with good performance in modifying the sag properties of polypropylene, for preparing a segmented copolymer of (i) a homopolymer of polypropylene or a copolymer which is mainly of units derived from polypropylene and of (ii) a polymer comprised of at least 80% of units derived from methyl methacrylate, comprises a. preparing a reaction mixture of about 100 parts of particles of polypropylene homopolymer or copolymer of average particle size below 6 mm. with
1. from about 300 to about 650 parts of water;
2. from about 35 to about 100 parts of a monomer mixture which is at least 80% by weight of methyl methacrylate;
3. from about 60 to about 100 parts of one or more organic solvents, miscible with the monomer mixture;
4. from about 0.2 to about 1 parts of at least one dispersant, the at least one dispersant maintaining the polyolefin particles in particulate form, at least one dispersant being chosen from polymers which are copolymers of units derived from (meth)acrylic esters and at least one of units derived from a partially or totally neutralized copolymerizable unsaturated acid;
5. from about 0.4 to about 1.1 parts of at least one polymerization initiator;

b) followed by polymerizing the reaction mixture in a pressure vessel with agitation at a heating rate of at least about 0.5° C./minute, preferably of at least 1° C./minute, until a temperature of at least about 120° C. is obtained;

c) holding the reaction mixture at the temperature of about at least 120° C. until essentially complete conversion of the monomers to polymer occurs, the polymer being formed being at least partially grafted to the polypropylene homopolymer or copolymer to form the segmented copolymer, the segmented copolymer remaining in particulate form;

d) separating the solvent from the segmented copolymer particles; and e) separating any remaining water from the particulate segmented copolymer particles.

The particulate polyolefins which are used in the present process are either flaked polymer, polymer pellets, or porous spherical polymers. Such are commercially available from several suppliers in various molecular weight and compositional versions. The 6 mm. particle length is that usually found from pelletized, extruded polymers, but similar pellets or chopped strands of slightly larger particle size may also be utilized. Preferred is a polypropylene homopolymer which is a porous spheroidal particle, believed similar to the material described in European Patent Application 437,808.

The solvents are inert or essentially inert to the free-radical polymerization process, are volatile enough that they may be readily removed by steam-stripping or vacuum devolatilization of the polymer particles without the need for fusion and extruder devolatilization. The solvents preferably are not so low-boiling that they create unduly high pressures when a pressure vessel is used to accomplish the polymerization. They should be miscible with the monomer(s) to be polymerized, relatively water-insoluble so as to be separable from water for re-use and to be removed by steam-distillation. Such solvents include alkanes, such as methylcyclohexane, aromatic hydrocarbons, such as benzene or t-butylbenzene, aliphatic ketones, such as 2-methyl-3-hexanone, higher alcohols, that is, monohydric alcohols of 5 carbons and above, such as the various pentanols, hexanols, heptanols, and the like, and mixtures of such solvents. Preferred for environmental reasons is a mixture of alkanes and aliphatic ketones or a mixture of higher alcohol and alkanes, such as heptane and pentanol, in a ratio of from about 3:2 to about 2:3.

For good sag resistance of the segmented copolymer in modifying the melt strength of polypropylene, and for good conversion of monomer to polymer, it is preferred that the ratio of solvent to polyolefin be from about 60 parts to about 100 parts per 100 parts of polyolefin, and further that the ratio of monomers to polyolefin be from about 35 parts to about 100, more preferably 50 to 80 parts, per 100 parts of polyolefin. It is further preferred that the ratio of [(solvent(s) plus monomer(s)] to polyolefin be between 1.4 to 2.0, and that the ratio of solvent(s) to monomer(s) be greater than about 1.

Critical to the invention is the presence of a specific dispersing agent. Several are taught in the prior art for use in solvent-containing or solvent-free systems where there is a time period for establishing a swollen non-polymerizing particle stabilized in the aqueous system by the dispersant. Those taught for such use have been shown ineffective in the present system where there is rapid heating, polymerization and swelling at the same time, leading in general to agglomeration of particles and resulting in a partially fused mass which requires mechanical energy to break back to particulate size.

In the laboratory, where heat-up rates can be better controlled, it was found that a heat-up rate of at least 1° C./minute afforded the best balance of rapid polymerization rates, high conversion of monomer to grafted polymer of high molecular weight, absence of either fines or agglomerates, and efficiency as a sagresistance additive for polypropylene. In larger-scale equipment, where the desired heat-up rate of at least 1° C./minute could not be obtained, a heat-up rate of at least 0.5° C./minute was found also to afford acceptable product and to avoid agglomeration during polymerization. Because the molecular-weight distribution of the resulting poly(methyl methacrylate) formed was wider than desired at the heat-up rate of below 1° C./minute, it is preferred that at least a 1° C./minute, and especially preferred that at least 2° C./minute, heat-up rate be utilized.

The effective dispersants found for this process are high molecular weight, i.e., above 100,000 and preferably above 3,000,000 in weight-average molecular weight, copolymers of units derived from (meth)acrylic esters and (meth)acrylic acid, where the (meth)acrylic esters are those of lower alkyl (meth)acrylates, such as ethyl acrylate, methyl methacrylate, butyl acrylate, and the like copolymerized with acrylic or methacrylic acid, the acids being at least partially neutralized. The dispersant may be slightly cross-linked. Preferred is a copolymer of about 35 parts ethyl acrylate and about 65 parts of poly(methacrylic) acid. Other conventional dispersants may also be present.

Adjustment of pH may be required to utilize the dispersant of choice most effectively, such as by attaining the most effective concentration of free acid and neutralized acid groups. Materials such as sodium dihydrogen phosphate, which aids in maintaining the pH of the aqueous medium at about 5, are found to be quite useful. It is further important for best control of dispersed polymer particle size to pre-activate the dispersant with a base such as sodium hydroxide to a pH of 6 to 7, wherein the dispersant is at least 50% neutralized, and then use the buffer system to bring the pH lower during the dispersion or slurry polymerization.

Dispersants found to be ineffective include: lambda carrageenan, a sulfonated polysaccharide, sulfonated polystyrene, sodium dodecylbenzenesulfonate, tricalcium phosphate, also known as hydroxyapatite, and a naphthalene sulfonate-formaldehyde condensate.

The effective dispersants disclosed above are most effective for polypropylene, which softens at a higher temperature than other polyolefins and has less tendency to stick to itself. When the polyolefin is an ethylene/propylene copolymer or polyethylene, it may further be necessary to conduct the methacrylate polymerization in two stages, first to build a protective hard shell of polymethacrylate which can be penetrated by the remaining monomer and solvents, but which seems to protect against sticking of the polyolefin to itself. At the end of the first polymerization (which is conducted at a temperature below the softening point of the polyolefin), more monomer is added and the temperature again raised as the polymerization continues.

Solvent recovery can be accomplished most effectively by steam-distilling the slurry of water, solvent, and dispersed segmented copolymer. Relatively simple experimentation will establish conditions whereby the solvent may be removed without causing the polymer particles to agglomerate. The solvents after steam-distillation may be separated from the water and used in further polymerizations, if desired. Alternatively, the slurry can be filtered, and solvents remaining in the particles removed by conventional vacuum-drying processes.

Initiators for the polymerization are those known to the art for polymerizations within the temperature range encompassing 75° C. to 145° C. A few experiments will establish the conditions sufficient to prepare high molecular weight segments at a reasonable rate of polymerization. Because the temperature is not maintained at a constant level, it is difficult to calculate a radical flux as a guide to selection of amount of initiator. A preferred initiator is t-butyl perbenzoate, which has a one-hour half-life at 125° C. and a ten-hour half-life at 101° C. Other peroxides, peresters and peracids having somewhat similar one-hour half-life/temperature relationships, may also be used, such as: 2,5-dimethyl-2,5-dibenzylperoxyhexane (138° C.), tert-butyl peroxybenzoate (125° C.), di-tert-butyl diperoxyphthalate (123° C.), methyl ethyl ketone peroxide (133° C.), dicumyl peroxide (135° C.) tert-butyl peroxycrotonate (118° C.), 2,2 bis -t-butyl(peroxybutane) (119° C.), t-butylperoxy isopropyl carbonate (119° C.), 2,5-dimethyl-2,5-bis(benzoylperoxy)-hexane (118° C.), t-butyl peracetate (120° C.), di-t-butyldiperoxy-phthalate (123° C.), and the like. The figures in parentheses are the 1 hr. half-life temperatures.

Other initiators may also be employed in versions of this process where the temperature is varied, for example, 2,4-pentanedione peroxide (167° C.), Di-t-butyl peroxide (149° C.), 2,5-dimethyl-2,5-di(t-butylperoxy)-hexyne (149° C.), 2,5-dimethyl-2,5-di(t-butylperoxy)-hexyne (149° C.), 2,5-dimethyl-2,5-di(t-butylperoxy) hexane (138° C.), and the like.

To predict the effect of the segmented copolymers on the thermoformability at low shear of polypropylene, the following improved "sag" test was devised. The polyolefin blends were compression molded in an electrically heated Carver press 15×15 cm or Farrel press 30.5×30.5 cm. The samples were molded between stainless steel with an appropriate spacer to provide the required thickness (0.25 to 3.8 mm). In one method the hot melt was taken directly from the mill roll and placed between two stainless steel sheets. This was then placed in the press set at 190° C. and pressed at high pressure (68-91 metric tonnes for the Farrel press and 6820 kg for the Carver press). After three minutes the mold was placed in an unheated press at high pressure for three minutes. In the other procedure, granulated material or pellets produced from an extrusion, Haake, or milling operation were dried and then compression molded. The procedure used was the same as for molding a melt except that a 5 minute preheat was used while maintaining a slight pressure on the press. This was followed by the high pressure molding in the hot and cold presses. A hot press of 190° C. was usually sufficient for mfr=4 polypropylenes, but higher viscosity polypropylenes would split during sag testing unless higher molding temperatures were used (195°–210° C.). The sag tests were performed on a compression molded sheet 10×10×0.15 cm. This sheet was clamped in a frame with a 7.6-cm-square opening. There were metal rulers attached to the front and back of the frame for use in measuring sag. The frame and sheet were placed in a hot, forced air oven (typically at 190° C.). The amount of sag of the center of the sheet was then recorded as a function of time. Typically, the sag was first recorded at 2.5 cm but for slow sagging materials sags as low as 16 mm were recorded. Data were recorded up to 10.2 cm of sag or for 30 minutes, whichever occurred first.

The term "slope" refers to the slope of a plot of the natural logarithm of the sag in centimeters versus time, resulting in a straight line. A high slope indicates that the material sags quickly while a low slope indicates that it sags slowly. The advantage of comparing slopes in this manner is that it eliminates any differences in oven cooling when the sample is introduced.

The polymers prepared by the process of the present invention are useful for the uses taught in the incorporated reference of Ilenda et al. The polypropylene//-methyl methacrylate segmented copolymers are useful in imparting melt strength and sag resistance to polypropylene and to other polyolefins, they may be used as processing aids for polypropylene, and as compatibilizers between polyolefins and polar polymers, as taught in Ilenda et al.

EXAMPLES

EXAMPLE 1

Segmented Copolymer from Polyolefin Flake

This example describes a large-scale preparation of a segmented copolymer by the present inventive process. To a 125-liter reactor equipped with nitrogen feed, means for evacuation, stirrer, mix tanks, feed pumps, and reflux condenser which can be converted to a means for solvent distillation is added from a mix tank (all parts are parts by weight on 100 parts of water; the actual weight of water used is 118.34 lbs. or 26 kg,)

| Deionized water | 100.00 parts |
| Monosodium phosphate | 1.70 |
| Dispersant | 0.10 |

The dispersant is poly(ethyl acrylate/methacrylic acid) 35/65, MW ca. 2,000,000, p.s. 125 nm) added as an emulsion of ca. 18% solids. Then polypropylene (flake product, mfr=4), 27 parts is added, the reactor inerted with three cycles of nitrogen and vacuum, and the reactor pressure-tested. A monomer charge of MMA/-BA=95/5 by weight totalling 19.1 parts is charged from a feed tank, followed by a solvent charge of 21.9 parts toluene. An initiator solution of 0.16 parts t-butyl perbenzoate dissolved in 3.2 parts of solvent is pumped into the reactor. The reflux condenser is sealed off from the reaction vessel, and the reactor heated to 145° C. at a rate at fast as possible (about 3° C./minute).

Shortly after the reaction temperature is achieved, a solution of dilauryl thiodipropionate (0.2 parts) and 4-t-butyl-3-hydroxy-2,6-dimethylbenzyl)-s-triazine-(1H, 3H, 5H)-trione (0.09 parts) in 3 parts of solvent are pumped into the reaction vessel, followed by 1.86 parts of an anti-foaming agent described as a modified polyethoxylated alcohol/polyethylene glycol mixture in an equivalent weight of water. The reactor is cooled to about 135° C., the pressure is equalized between the reactor and the condenser, and the solvent/water azeotrope is removed at about 140°, with vacuum being applied to eventually about 15 psia (3.1 megadynes/cm2.)

When the phase volume ratio of water to organic liquids in the condensate is about 40 to 1, the batch is cooled to 125° C. at a rate of about 2°/minute, then cooled to 40° C. at about 3°/minute. The batch is transferred with nitrogen to a second reactor, washed with 60 parts of water, re-slurried with the rinse water, filtered and air-dried. The final water may be removed by vacuum-drying at about 60° C.

EXAMPLE 2

Segmented Copolymer with Different Solvent

A similar reaction as Example 1 is conducted but the toluene solvent is replaced with a 60/40 by weight mixture of 5-methyl-2-hexanone and cyclohexane.

EXAMPLES 3 and 4

Segmented Copolymer from Porous Spherical Polypropylene

These examples parallel Examples 1 and 2, except that the polypropylene is a porous polypropylene spherical material of mfr=4.2.

EXAMPLES 5-8

Repeats of Example 3

Four repeat 125 liter runs are made following the process of example 1. The starting polypropylene has a melt flow rate (mfr) of 4.2 grams/10 min. Changes among the runs are detailed below. Run 8 gives the best dispersion of product, probably relating to slower cooldown times and careful solvent devolatilization. All runs give acceptable product, as measured by the sag test.

| Example | 5 | 6 | 7 | 8 |
|---|---|---|---|---|
| Polymerization heat-up time, hrs.:mins | 1:35 | 3:05 | 3:45 | 1:55 |
| Post-reaction cool-down time, hrs.:mins | 0:15 | 0:15 | 0:25 | 3:45 |
| pH adjusted to 5 after reaction | No | No | No | Yes |
| Monomer/Polypropylene (PP) | 0.6 | 0.7 | 0.7 | 0.7 |
| Solvent/PP | 0.75 | 0.80 | 0.80 | 0.80 |
| Initiator/PP × 1000 | 6.0 | 6.6 | 6.6 | 6.6 |
| Anti-foam/PP × 100 | 3.2 | 3.2 | 3.2 | 6.4 |
| Buffer/PP | 0.103 | 0.101 | 0.101 | 0.101 |
| Sag slope, 2% in PP | 0.018 | 0.134 | 0.066 | 0.042 |
| Mw, acetone extract, × .0001 | 7.33 | 10.9 | 16.1 | 12.0 |
| Melt flow rate, condition L, grams/10 min. | 0.26 | 0.99 | 0.64 | 0.62 |

EXAMPLE 9

Process with Hydrocarbon/Alcohol Mixed Solvent

This example illustrates use of a hydrocarbon/alcohol mixed solvent. Deionized water (1783.4 gm), NaH2PO4 (16.31 gm, 5.16% based on PP), the dispersant of Example 1 (56.262 gm, 2% emulsion solids, 0.356% based on PP, pre-neutralized to 64%) are charged to a pressure reactor. The pH of the mixture is 5.31. Then are added polypropylene (316.08 gm, polypropylene beads as in Example 3), MMA/BA (210.4 gm/11.07 gm respectively, 70% total monomer based on PP), n-heptane (151.717 gm, 48% based on PP), 1-pentanol (101.145 gm, 32% based on PP), and t-butyl perbenzoate (2.082 gm, 0.94% based on monomer, 0.66% based on PP, 1-hr t1/2 temperature=125° C., 10-hr t1/2=101° C., 8.1% active oxygen). The vessel is closed and taken through four vacuum/pressure cycles with agitation. The agitation is then set to 250 rpm, a pressure pad of −2 psig (ca. −14 kPa) is applied, and heating to 120° C. at a rate of 1° C./min is begun. The initial temperature is 19° C. Once the reaction reaches 120° C., it is held there for 0.5 hour and then heated to 135° C. and held there for 2 hours. After 1.5 hrs at 135° C., Cyanox 1790 (structure shown in Example 1, 1.074 gm, 0.34% based on PP) and dilauryl thiodipropionate (0.283 gm, 0.09% based on PP) are added in n-heptane (7 gm) and 1-pentanol (7 gm). At the end of the 2 hour hold, the reaction is cooled to room temperature, the pressure released and the product removed from the reactor. The pH of the white water is 4.95 and it contains 0.77% solids. Drying at 60° C. overnight in a vacuum oven set at 28 mm Hg yields 516 gm product (90% conversion of monomer).

Molecular weight analysis of the soluble p-MMA/BA indicates an Mw of 149,000 with a polydispersity of 3.4. Sag slope of this material at 2% loading is 0.13.

EXAMPLE 10

Process with Toluene as Solvent

This example is a laboratory-scale comparison of toluene as a solvent, relating to Example 9. Deionized water (1746 gm), NaH₂PO₄ (20.667 gm, 6.59% based on PP), the dispersant of Example 1 (95.724 gm, 2% emulsion solids, 0.61% based on PP, pre-neutralized to 43%) are charged to a pressure reactor. The pH of the mixture is 5.37. Then polypropylene (313.85 gm, as in Example 3, beads), MMA/BA (208.91 gm/11.0 gm respectively, 70% total monomer based on PP), toluene (251.708 gm, 80.2% based on PP), and t-butyl perbenzoate (2.067 gm, 0.94% based on monomer, 0.66% based on PP). The vessel is closed and taken through four vacuum/pressure cycles with agitation. The agitation is then set to 250 rpm, a pressure of −30 psig (ca. −210 kPa) applied, and heating to 120° C. at a rate of 2° C./min is begun. The initial temperature is 19° C. Once the reaction reaches 120° C., it is held there for 0.5 hour and then heated to 145° C. and held there for 1.5 hours. The reaction is then cooled to room temperature, the pressure released and the product removed from the reactor. The white water had a final pH of 4.84 and contains 1.14% solids. Drying at 60° C. overnight in a vacuum oven set at 28 mm Hg yields 511 gm product (90% conversion based on monomer).

Molecular weight analysis of the soluble p-MMA/BA indicates an average (three extractions) Mw of 116,000 with a polydispersity of 2.2. The wt % acrylic in the sample is 8.9%. Sag slope of this material at 2% loading is 0.09 and the mfr (condition L) is 0.70.

EXAMPLE 11

Process Varying Initiator Concentration

In a manner similar to Example 10, but with t-butyl perbenzoate at 2.595 gm, 1.18% based on monomer, 0.83% based on PP, the polymerization reaction is conducted. The white water has a final pH of 4.77 and contains 1.36% solids. Drying at 60° C. overnight in a vacuum oven set at 28 mm Hg yields 508 gm product (88% conversion based on monomer). Molecular weight analysis of the soluble p-MMA/BA indicates an Mw of 111,000 with a polydispersity of 4.14. The wt % acrylic in the sample is 8.4%. Sag slope of this material at 2% loading is 0.07 and the mfr (condition L) is 0.56.

EXAMPLE 12

Another Example of Polypropylene Pellets

Polymerization of MMA/BA onto PP exactly as Example 10 except using commercial polypropylene pellets, (Himont 6523), which have no porous structure, yields 530 gm product (98% conversion based on monomer). Molecular weight analysis of the soluble p-MMA/BA indicates an Mw of 115,000 with a polydispersity of 4.85. The wt % acrylic in the sample is 7.4%. Sag slope of this material at 2% loading is 0.08 and the mfr (condition L) is 0.37.

EXAMPLE 13

Process Variants

In a manner similar to Examples 10–12 are prepared PP//MMA-BA segmented polymers, with the following changes: (a) standard reaction (as in Example 10), but with pH adjusted to 4.5; (b) 25% less monomer; (c) 25% more monomer; (d) 25% less initiator; (e) 50% higher initiator; (f) no butyl acrylate; (g) heat to 120° C. for whole reaction; (h) no hold at 120° C., i.e. heat directly to 145° C.; (i) standard reaction but only hold 1 hour at 145° C.; (j) cool reaction after reaching 145° C. (i.e., no hold); (k) charge ½ of feed and add other ½ at 120° C.; (l) run reaction at 135° C. (with hold at 120° C.); (m) run reaction directly to 135° C. (no hold at 120° C.); (n) run reaction at 130° C. (with hold at 120° C.); (o) run reaction directly to 130° C. (no hold at 120° C.); (p) quench at 120° C. with MEHQ (monomethyl ether of hydroquinone); (q) quench at 145° C. with MEHQ.

In all cases, results similar to those reported for Examples 10–12 are achieved.

EXAMPLE 14

Further Solvent Variations

In a manner similar to Example 9, other ratios of heptane/pentanol or with replacement of pentanol with 5-methyl-2-hexanone are charged, and the reactions are conducted with similar results.

EXAMPLE 15

This Example describes larger-scale preparations (31 gallon=117 liter reactor) at a heat-up rate of below 1° C./minute. Following the procedure of examples 3, 5, 6, 7, and 8, a number of preparations were made at heat-up rates of between 0.9° to 1.8° C./minute, as measured on the reactor contents. Toluene was the co-solvent employed. Sag slopes at 2% in polypropylene were below 0.2 in all instances. The best balance of product appearance, as measured by absence of "fines" and agglomerates in the resultant isolated segmented copolymer, was achieved at heat-up rates of at least 1.2° C./minute.

EXAMPLE 16

A kettle of ca. 2300 gallons (8700 liters) capacity was equipped essentially as that described in the above examples, except that half-baffles were installed sub-surface to promote mixing and avoid particle agglomeration at the surface. Heptane/pentanol mixture was used as the co-solvent. Such baffles are the subject of a separate patent application to be filed shortly after the filing of the present application. A polymerization as described in the earlier examples was conducted; heat-up rates were measured on the batch by recording the temperature every 10 minutes. In the temperature range from 105.6° F. (40.9° C.) to 265.4° F. (129.7° C.), the heat-up time was 1 hr. 50 minutes, averaging 0.81° C./minute. The resulting product had acceptable sag behavior when tested for its ability to modify the low-shear rheology of polypropylene.

We claim:

1. A process for preparing a segmented copolymer of at least one segment of a polyolefin and of at least one segment of a polymer comprised of greater than about 50 weight percent of units derived from at least one alkyl methacrylate, comprising:
    a) preparing a reaction mixture of about 100 parts of particles of polyolefin of average particle size below about 6 mm. with
        (i) from about 150 to about 2000 parts of water;
        (ii) from about 10 to about 100 parts of a monomer mixture which is greater than 50% by weight of at least one alkyl methacrylate;
        (iii) from about 40 to about 200 parts of one or more organic solvents, miscible with the monomer mixture;
        (iv) from about 0.2 to about 5 parts of at least one dispersant, the at least one dispersant maintaining the polyolefin particles in particulate form, at least one dispersant being chosen from polymers which are copolymers of units derived from (meth)acrylic esters and units derived from one or more partially or totally neutralized copolymerizable unsaturated acids;
        (v) from about 0.1 to about 2 parts of at least one polymerization initiator;
    b) polymerization the reaction mixture in a pressure vessel with agitation at a heating rate of at least 0.5° C./minute until a temperature of at least about 75° C. is obtained;
    c) holding the reaction mixture at the temperature of at least about 75° C. until the monomer is polymerized, the alkyl methacrylate polymer being formed being at least partially grafted to the polyolefin to form the segmented copolymer, the segmented copolymer remaining in particulate form;
    d) optionally further adding to the reaction vessel
        (i) from about 10 to about 70 parts of a second monomer mixture which is greater than 50% by weight of at least one alkyl methacrylate;
        (ii) from about 5 to about 150 parts of organic solvent, miscible with the second monomer mixture;
        (iii) up to about 1 part of at least one dispersant, the at least one dispersant maintaining the polyolefin particles in particulate form, at least one dispersant being chosen from polymers which are copolymers of units derived from (meth)acrylic esters and units derived from one or more partially or totally neutralized copolymerizable unsaturable acids;
        (iv) from about 0.01 to about 2 parts of at least one polymerization initiator;
    e) optionally continuing heating at a temperature increase of at least about 0.5° C./minute until essentially complete conversion of the monomers to polymer occurs, the alkyl methacrylate polymer being formed being at least partially grafted to the polyolefin to form the segmented copolymer, the segmented copolymer remaining in particulate form;
    f) separating the solvent from the particulate segmented copolymer particles;
    g) separating any remaining water from the particulate segmented copolymer particles.

2. A process for preparing a segmented copolymer of
    (i) at least one segment of a homopolymer of polypropylene or a copolymer which is mainly composed of units derived from propylene and of
    (ii) at least one segment of a polymer comprised of at least 80% of units derived from methyl methacrylate, comprising
        a) preparing a reaction mixture of about 100 parts of particles of polypropylene homopolymer or copolymer of average particle size below 6 mm. with
            (i) from about 300 to about 650 parts of water;
            (ii) from about 35 to about 100 parts of a monomer mixture which is at least 80% by weight of methyl methacrylate;
            (iii) from about 60 to about 100 parts of one or more organic solvents, miscible with the monomer mixture;
            (iv) from about 0.2 to about 1 parts of at least one dispersant, the at least one dispersant maintaining the polyolefin particles in particulate form, at least one dispersant being chosen from polymers which are copolymers of units derived from (meth)acrylic esters and units derived from one or more partially or totally neutralized copolymerizable unsaturated acids;
            (v) from about 0.4 to about 1.1 parts of at least one polymerization initiator;
        b) followed by polymerizing the reaction mixture in a pressure vessel with agitation at a heating rate of at least 0.5° C./minute until a temperature of at least about 120° C. is obtained;
        c) holding the reaction mixture at the temperature of about at least 120° C. until essentially complete conversion of the monomers to polymer occurs, the methyl methacrylate polymer being formed being at least partially grafted to the polypropylene homopolymer or copolymer to form the segmented copolymer, the segmented copolymer remaining in particulate form;
        d) separating the solvent from the particulate segmented copolymer particles;
        e) separating any remaining water from the particulate segmented copolymer particles.

3. The process of claim 1 wherein the polyolefin is predominately composed of units derived from propylene or ethylene or copolymers thereof.

4. The process of claims 1 or 2 wherein the at least one dispersant is a partially neutralized copolymer of about 35 parts ethyl acrylate and about 65 parts of (meth)acrylic acid and with a weight-average molecular-weight above 100,000.

5. The process of claims 1 or 2 wherein the solvent is separated from the segmented copolymer particles by distillation at a temperature above the softening point of the segmented polymer particles.

6. The process of claim 1 wherein a portion of the alkyl methacrylate monomer is polymerized at a temperature below the softening point of the segmented copolymer, followed by polymerization of the remaining alkyl methacrylate monomer by heating the contacted particles in a pressure vessel with agitation at a rate of at least 0.5° C./minute until a temperature of at least about 145° C. is obtained.

7. The process of claim 1 wherein the polyolefin is a non-polar polyolefin selected from the group consisting of polyethylene, polypropylene, polybutylene, poly(4-methylpentene), copolymers of olefins with each other and copolymers of olefins with minor amounts of vinyl esters, vinyl chloride, and (meth)acrylic acid having a weight-average molecular-weight of from about 50,000 to about 1,000,000, and wherein the alkyl methacrylate polymer formed has a weight-average molecular weight of from about 20,000 to about 200,000.

8. The process of claim 2 wherein the polypropylene homopolymer or copolymer has a weight-average molecular-weight of from about 50,000 to about 1,000,000, and wherein the methyl methacrylate polymer has a weight-average molecular weight of from about 20,000 to about 200,000.

9. The process of claim 1 wherein the alkyl methacrylate polymer formed contains up to about 50% of units derived from at least one other methacrylate ester, an acrylate ester, an unsaturated copolymerizable acid, or a vinyl aromatic monomer.

10. The process of claim 2 wherein the methyl methacrylate polymer formed contains up to about 20% of units derived from at least one other methacrylate ester, an acrylate ester, an unsaturated copolymerizable acid, or a vinyl aromatic monomer.

11. The process of claims 9 or 10 wherein the unsaturated copolymerizable acid is methacrylic acid or acrylic acid.

12. The process of claim 11 wherein further the units derived from the unsaturated copolymerizable acid are at least partially converted to an ammonium, alkaline earth, alkali metal, or zinc salt prior to or during isolation.

* * * * *

UNITED STATES PATENT AND TRADEMARK OFFICE
CERTIFICATE OF CORRECTION

PATENT NO. : 5,310,810

DATED : May 10, 1994

INVENTOR(S) : John Natoli and Min-Yin Chang

It is certified that error appears in the above-identified patent and that said Letters Patent is hereby corrected as shown below:

Column 11, Line 36, Claim 1 should read:

b) polymerizing the reaction mixture in a pressure instead of:

b) polymerization the reaction mixture in a pressure

Signed and Sealed this

Third Day of January, 1995

Attest:

BRUCE LEHMAN

Attesting Officer

Commissioner of Patents and Trademarks